July 5, 1932. P. P. PIPES 1,865,720

ELECTRICAL CONNECTER

Original Filed April 28, 1925

Inventor
Pliny P. Pipes
By
Attorney

WITNESS:
Herbert W. Freeburg

Patented July 5, 1932

1,865,720

UNITED STATES PATENT OFFICE

PLINY P. PIPES, OF MANSFIELD, OHIO, ASSIGNOR TO THE OHIO BRASS COMPANY, OF MANSFIELD, OHIO, A CORPORATION OF NEW JERSEY

ELECTRICAL CONNECTER

Application filed April 23, 1925, Serial No. 26,500. Renewed February 24, 1930.

My invention relates to connecters and particularly that class of connecters known as rail bonds for connecting the adjacent ends of conductor rails.

The object of my invention is to provide a simple, efficient and economical rail bond by means of which the rails may be bonded by the use of the electric arc or gaseous flame to unite the bond terminals to the rail.

In the type of bond terminal I have shown in the accompanying drawing, it is the intention to apply the same by means of a copper or bronze welding metal rather than by steel or iron welding metal. In uniting the bond terminal to the rail I prefer to use a copper attaching metal which has had alloyed with it a flux material such as phosphorous, manganese, silicon or boron, as with a material of this character the deposited metal will be denser, it will form a better union with the rail and bond terminal and will be of a higher electrical conductivity. Copper rods coated with preparations containing the above materials have been used for this purpose, but I prefer to use a metal in which the above fluxes form a component part of a complete welding material and in which the flux is uniformly distributed throughout the mass.

The bond may be applied, as stated before, by either the electric arc welding process or by means of a gaseous flame such as the oxyacetylene flame and neither of these require extensive description as both systems of welding have been employed for many years in the various arts and especially for the welding of rail bonds to the rails. Of the two processes, I prefer to use the electric arc system, and I prefer to use that system in which a metal electrode is used and which is composed of the same metal as is deposited for uniting the bond terminal to the rail.

I have not shown a complete rail bond as rail bonds are common and well known, but have shown only one end of a bond as both ends are alike and the portion between the terminals may be formed to any shape desired to meet the various requirements.

My invention resides in the new and novel construction, combination and relation of the various parts making up a rail bond terminal as hereinbefore fully described and disclosed in the accompanying drawing.

In the preferred embodiment of my invention I employ a body member 1 which is usually composed of a plurality of copper wires so as to give flexibility to the body portion. To the ends of the body member 1 are secured terminal members T. These terminal members are preferably formed of ferrous metal and may be either a drop forging, a sheet metal stamping, formed to shape, or a casting.

Figure 3:
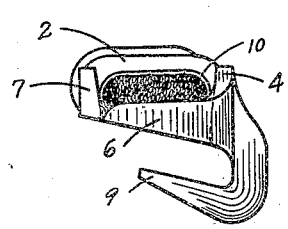
Fig. 3 is an end view of Fig. 2.
Figure 1:
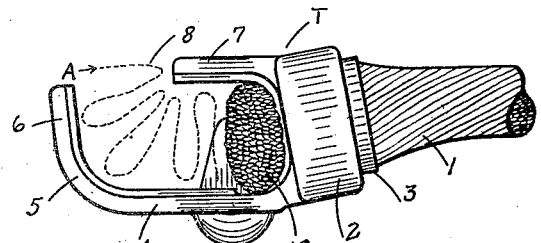
Fig. 1 is a top plan view of the bond terminal.

In the terminal member 1, which I have shown in the drawing, I provide a collar portion 2 which is provided with a passage therethrough to receive the end of the body member 1. The end of the body member is positioned in the passage referred to with its end face flush with the end face of the collar 2 or projecting somewhat beyond the exposed surface of the end face being inclined at an oblique angle to the axis of the bond body, as shown in Fig. 1. The collar is compressed about the end of the body member 1 so as to mechanically unite the two. Interposed between the collar member 2 and the body member 1 is a sleeve 3 preferably of sheet copper which protects the individual wires forming the body member 1 from being injured by contact with the edge of the collar 2.

Projecting from one side of the collar 2 is a finger member 4 provided with a bight 5 and an extension 6 substantially at right angles to the member 4. The finger member 4, bight 5 and extension 6 form a retaining wall for the molten welding metal so as to assist in catching, supporting and retaining the same and this retaining wall varies in height from the extreme end to the point where it attaches to the collar 2 so as to provide a slope to the attaching metal which will have its greatest depth adjacent the collar and its shallowest depth at the opposite end of the terminal.

I have found it of considerable advantage to form a short finger member 7 on the diametrically opposite side of the collar 2 and projecting only part way toward the end of the terminal member T thereby leaving an opening 8 between the end of the extension 6 and the member 7. I find this short member 7 of considerable benefit as it assists in preventing the molten attaching metal from flowing away from the end of the body member 1, as I find that as the attaching metal is of the greatest depth at this point and much hotter it is liable to remain in a somewhat fluid state longer and, therefore, has a tendency to flow away but with a short retaining member 7 this difficulty is overcome.

I also find it of advantage to secure to the terminal member an under-turned hook member 9 adapted to engage the lower face of the rail base when the bond terminal has been applied in position in order to hold the terminal in position while the attaching metal is being deposited. The hook member 9 is so related to the members 4 and 7 of the bond terminal that when the bond terminal is applied to a rail base the base will be gripped before the terminal is fully positioned and this condition is beneficial for the reason that in finally positioning the bond terminal it is necessary to force the hook 9 downward thereby gripping the base more securely and by a proper construction the hook member 9 can be made to materially assist in holding the bond in position after the welding metal has been applied. It will be noted in Fig. 5 that the hook member 9 is so constructed that the bond could still be applied to a rail having a thicker base as there is a space between the lower face of the base and the upper face of the hook 9 which would permit the application of the bond to a thicker rail base.

Figure 4:
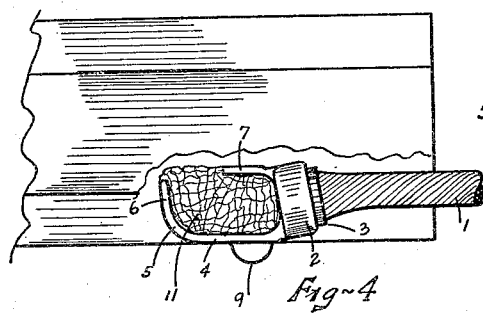
Fig. 4 is a top view of a bond terminal as applied to the base of a rail.
Figure 2:
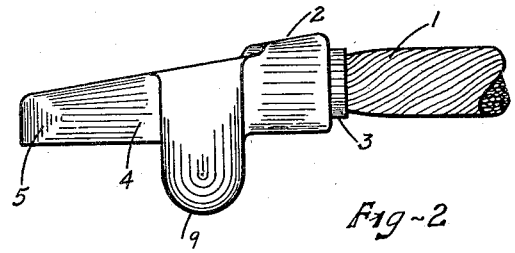
Fig. 2 is a side view in elevation of Fig. 1.
Figure 5:
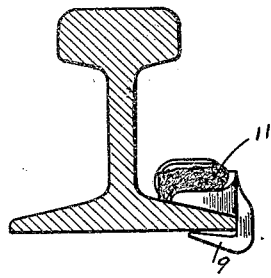
Fig. 5 is an end view of Fig. 4.
Figure 6:
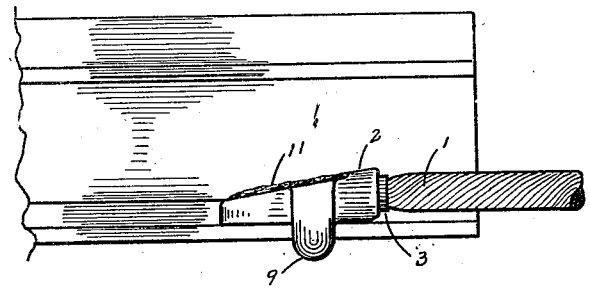
Fig. 6 is a side view of Fig. 4.

It will be noted that the inner faces of the arms 4 and 7 are tapered downwardly and inwardly, and also when the terminal is applied to a rail base the upper faces of the arms 4 and 7 will be substantially parallel with the lower face of the rail base and this provides a means of forming the welding metal in a substantially level face transversely of the rail, but since the arms 4, 5 and 6 taper away from the collar 2 the face of the attaching metal will slope in a longitudinal direction with the rail. This latter slope is a point of economy as there is not the need of the cross section of attaching metal at a distance from the bond body 1 that there is adjacent the bond body 1, and, therefore, considerable time and material is saved in the application of a terminal of this construction to a rail. In the application of the bond to the rail by means of an electric arc welding process in which the electrode is made of the attaching metal the bond terminal is first positioned upon the rail, as shown in Figs. 4, 5 and 6. An electric arc is then struck between the metal electrode and the rail adjacent the point A, and as the metal from the electrode is deposited upon the rail the point of the electrode is caused to follow a path approximating that of the dotted line shown in Fig. 1. This will form a layer of the attaching metal over the upper face of the rail base within the confines of the arms 4, 5, 6 and 7 and which will be fused to the base of the rail. When the path of the electrode reaches the end face of the body member 1 the arc is caused to play upon the end face 10 adjacent the rail base and metal from the electrode is deposited in the angle formed between the face of the rail and the face 10 of the body member 1 and fused to these members. The path of the electrode is then caused to re-trace itself thereby forming a second layer upon the first and fused thereto. A third layer may then be formed upon the second, as just described, and it will also be fused to the second layer and each layer will also be fused to the end face 10 of the body member 1. Since the arms 4, 5, 6 and 7 vary in depth the number of layers applied adjacent the bond body 1 will be greater than at the extreme end of the terminal, therefore, the heat of the parts adjacent the end of the body member 1 will be much greater than at the end of the terminal, and it is for this reason that I find it advisable to apply the finger 7 to the terminal, but leaving a space 8 as great as possible as it is much easier to work the electric arc without being confined as by the walls 4, 7, etc. The inner side walls of the members 4, 5, 6 and 7 are tapered downwardly and inwardly thereby making it possible to apply the electric arc to better advantage in the corner or angle formed by the side walls and the upper face of the rail base.

While I have described a terminal and its application for one end of the bond, it will be well known that both ends of the body member 1 are provided with the same kind of terminal which is applied in the same manner. However, the terminal at the opposite end of the body member 1 would be constructed in reverse order in order that it could be properly applied to the rail base, but my description would apply to such a terminal also.

The attaching metal 11 will unite the body member, the terminal member and the rail each to the other and the terminal member will add materially to the permanent union of the bond body to the rail as compared with a connection depending only upon the union between the attaching metal and the body member.

It will be noted that the arms 4 and 7 project at an angle to the axis of the collar 2 and this has an advantage in that it will throw the body member 1 toward the upright rail web and underneath the ball of the rail along the base thereby offering protection to the bond body.

There will be modifications which will be apparent to those skilled in the art which will fall within the scope of my invention, therefore, I do not wish to be limited other than by my claims.

I claim.

1. An electric connecter comprising a body member and a separately formed terminal member secured to the end thereof, the terminal member having a sleeve portion with a passage therethrough to receive the body member, the terminal member also provided with spaced walls extending from the sleeve portion and forming a space therebetween increasing in depth from the ends of the side walls to the sleeve portion and increasing in depth between the walls transversely of the longitudinal axis and having an opening through the walls communicating with the space therebetween, the end of the body member exposed within the said space and means forming a part of the terminal member to engage the rail in clamping relation to hold the terminal in position on the rail while it is being welded thereto.

2. An electric connecter comprising a body member and a separately formed terminal member secured thereto, the terminal member having a portion to receive the end of the body member and oppositely disposed means projecting from the said portion, forming a recess open on opposite faces and to form a receptacle open on one face when applied to a rail surface and into which the end of the body member projects, to receive fused attaching metal in fused relation to the sides of the recess and the rail surface and the end face of the body member to secure the said parts together, each to the other, a sleeve of metal dissimilar from that of the said portion interposed between the body and the said portion to protect the body from injury and means for holding the bond terminal and engaging the face of the rail opposite to that receiving the attaching metal to hold the body and terminal in position while installing.

In testimony whereof I affix my signature.

PLINY P. PIPES.